United States Patent [19]
Ramsay et al.

[11] Patent Number: 4,915,490
[45] Date of Patent: Apr. 10, 1990

[54] OPTICAL FIBRE CABLE WITH CRUSH-RESISTANT TUBE

[75] Inventors: Melvin M. Ramsay, London; Philip W. Black, Herts; Idwal D. L. Jones, Glamorganshire, all of Great Britain

[73] Assignee: STC PLC, London, England

[21] Appl. No.: 363,487

[22] Filed: Jun. 8, 1989

[30] Foreign Application Priority Data

Jan. 13, 1987 [GB] United Kingdom ............... 8700681

[51] Int. Cl.⁴ .................................. G02B 6/44
[52] U.S. Cl. ........................ 350/320; 57/215; 350/96.23
[58] Field of Search .................. 350/96.23, 320; 174/115, 128.1, 129 R, 129 S, 130, 131 R, 131 A; 57/215, 3.5, 9

[56] References Cited

U.S. PATENT DOCUMENTS

| | | | |
|---|---|---|---|
| 3,131,469 | 5/1964 | Glaze | 174/128.1 X |
| 3,234,722 | 2/1966 | Gilmore | 57/215 |
| 3,444,684 | 5/1969 | Schoerner et al. | 57/215 X |
| 3,778,993 | 12/1973 | Glushko et al. | 57/215 |
| 3,872,659 | 3/1975 | Campbell et al. | 57/215 X |
| 3,956,877 | 5/1976 | Gilmore | 57/215 X |
| 4,778,246 | 10/1988 | Carroll | 350/96.23 |

FOREIGN PATENT DOCUMENTS

| | | |
|---|---|---|
| 0060061 | 9/1982 | European Pat. Off. |
| WO84/00820 | 3/1984 | PCT Int'l Appl. |
| 1486764 | 9/1977 | United Kingdom |
| 2017968 | 10/1979 | United Kingdom |
| 2043936 | 10/1980 | United Kingdom |
| 1598438 | 9/1981 | United Kingdom |
| 2088584 | 6/1982 | United Kingdom |
| 2090995 | 7/1982 | United Kingdom |
| 2105484 | 3/1983 | United Kingdom |
| 2125984 | 3/1984 | United Kingdom |
| 2165662 | 4/1986 | United Kingdom |
| 2173034 | 10/1986 | United Kingdom |
| 2199961 | 7/1988 | United Kingdom |

Primary Examiner—John D. Lee
Attorney, Agent, or Firm—Lee, Mann, Smith, McWilliams & Sweeney

[57] ABSTRACT

A crush-resistant tube for a plastics packaged optical fibre (1, 2) is formed by helically stranding together five or more non-circular cross-section wires (3) which are created from circular cross-section wires during the stranding operation.

5 Claims, 3 Drawing Sheets

OPTICAL FIBRE CABLE WITH CRUSH-RESISTANT TUBE

BACKGROUND OF THE INVENTION

This invention relates to optical fibre cables and cable elements and is concerned with constructions affording good crush resistance for one or more optical fibres contained within such structures.

In UK Patent Specification No. 1486764 there is described a cable construction in which optical fibres are located in the interstices formed in a close-packed assembly of substantially circular cross-section steel wires. Each interstice is defined by three wires in contact along their length, and such an interstice is occupied by no more than a single optical fibre provided with a plastics protective coating. Such an arrangement gives a good measure of protection for the fibres because the arrangement of the wires defines a minimum size for the cross-section area of an interstice. A drawback is, however, that the diameter of the individual wires has to be more than six times the diameter of the plastics packaged fibre, and hence the construction is bulky. The size of the structure could be reduced by housing the or each packaged fibre in the interstice formed by a square array of four circular cross-section steel wires, each in line contact with its two fibres. In the absence of a helical lay such a structure is inherently unstable insofar as there is no constraint against two non-adjacent wires driving the other two slightly further apart by themselves coming together in the centre of array. This problem can be resolved by imparting a helical lay to the four wires, and the result is a strong structure that is slightly smaller than the structure using three wires. A still smaller structure, albeit with reduced stability, is achievable with a helical arrangement of five circular cross-section wires; whereas with six wires the further reduction in size is obtained at the expense of producing a metastable structure that is pressure resistant only if the applied pressure is purely hydrostatic and the structure is quite uniform with perfect radial symmetry. Such a metastable condition is of little use in practical cables.

An alternative approach to this problem, and one that is not limited to the use of five or fewer wires, is that described in United Kingdom Patent Specification No. 2090995 A, where a structure is provided that consists of circular cross-section and waisted cross-section wires laid alternately side by side to form a tube. A drawback of this approach lies in the problems associated with preventing any twists forming in the waisted cross-section wires during their laying up with the circular cross-section ones.

SUMMARY OF THE INVENTION

It is a general object of the present invention to afford a way of avoiding this problem of twisting.

According to the present invention there is provided a method of manufacturing an optical fibre cable or cable element consisting of or including an optical fibre encased in a crush-resistant tube constituted by a set of at least five helically stranded non-circular cross-section wires, in which method the non-circular cross-section wires are created from circular cross-section wires as the wires are stranded to form the tube. The resulting structure, comprising an optical fibre encased within a crush resistant tube, may be used as a single fibre cable, such a cable typically being provided with a plastics sheath; or alternatively it may be used as a cable element for inclusion with other cable elements to form a larger cable that will normally include a number of optical fibres. The space between the packaged fibre and the crush-resistant tube may, if desired, be filled with a suitable gel.

BRIEF DESCRIPTION OF THE DRAWINGS

There follows a description of alternative methods of making a cable element embodying the invention in a preferred form. The description refers to the accompanying drawings in which.

DETAILED DESCRIPTION OF PREFERRED EMBODIMENTS

An optical fibre package 20 for enclosure within the crush-resistant tube to be made by the method of the present invention typically comprises an optical fibre 11 encased within one or more plastics protective layers 12. Optionally the plastics packaged fibre may be encased loosely within a metal tube 13 that provides a hermetic barrier.

Figure 1:
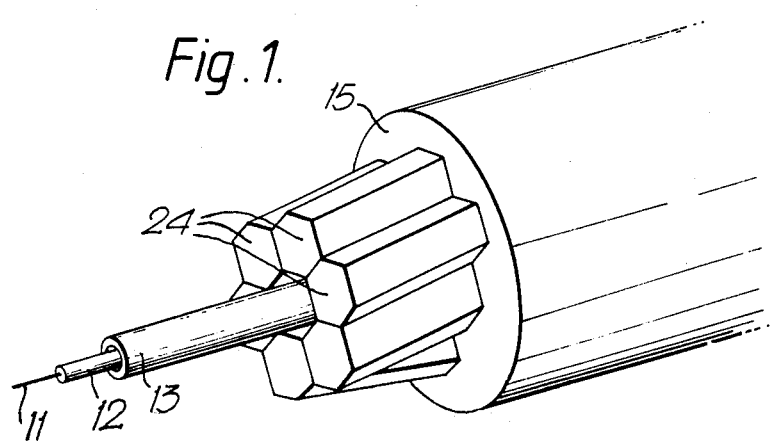
FIG. 1 is a perspective view of a part cut-away piece of cable made by a method, according to the present invention.

The crush-resistant tube is provided using a planetary strander. This strander has a hollow rotating shaft 21 through which the optical fibre package 20 is fed. Secured to this shaft is a plate 22 loaded with a set of spools 23 of circular cross-section wire. Wires 24 from these spools are paid-off and drawn through individual dies 25 which are mounted on cradles 26 that carry the spools 23 of the planetary strander. These dies 13 are employed to work the individual wires 24, changing their cross-section from circular symmetry into a non-circular form that will cause the wires to lock together in a stable crush-resistant manner when they are helically stranded by the planetary strander to form a tube. Typically six spools 11 are employed to form the set, and under these circumstances a convenient cross-section to which to work the fibres is that of a regular hexagon. Control over the laying-up of the wires is exercised by passing them through individual apertures in a lay-plate 27 that rotates with the shaft 20, and bringing them down into contact with each other by passing them through a stationary closing die 28. The pitch of the helical stranding of the wires 24 is controlled by relating the rotational speed of the shaft 21 to the linear speed at which the wires are drawn through the closing die 28. The resulting crush-resistant tube is then usually provided with an extruded plastics sheath. This sheath is conveniently provided on-line with the laying-up of the wires to form the crush-resistant tube. Such a sheath is depicted at 15 in FIG. 1. In this figure the six wires 24 that go to make the crush-resistant tube have been worked by the dies 25 from circular cross-section into hexagonal cross-section.

Figure 3:
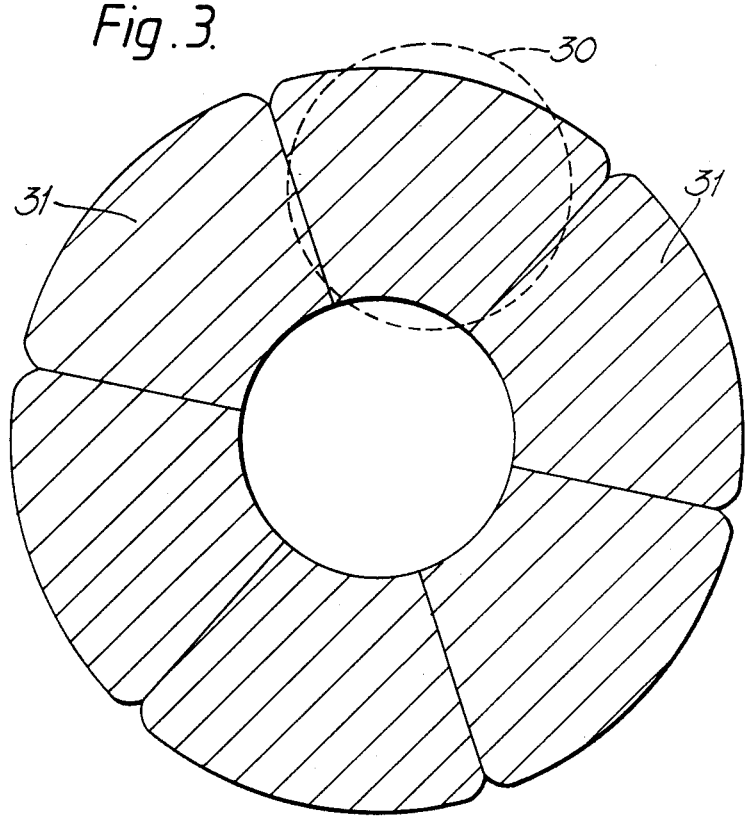
FIG. 3 is a schematic cross-sectional view of the crush-resistant tube of a piece of cable made using a modification of the method employed in the manufacture of the cable of FIG. 1.
Figure 2:
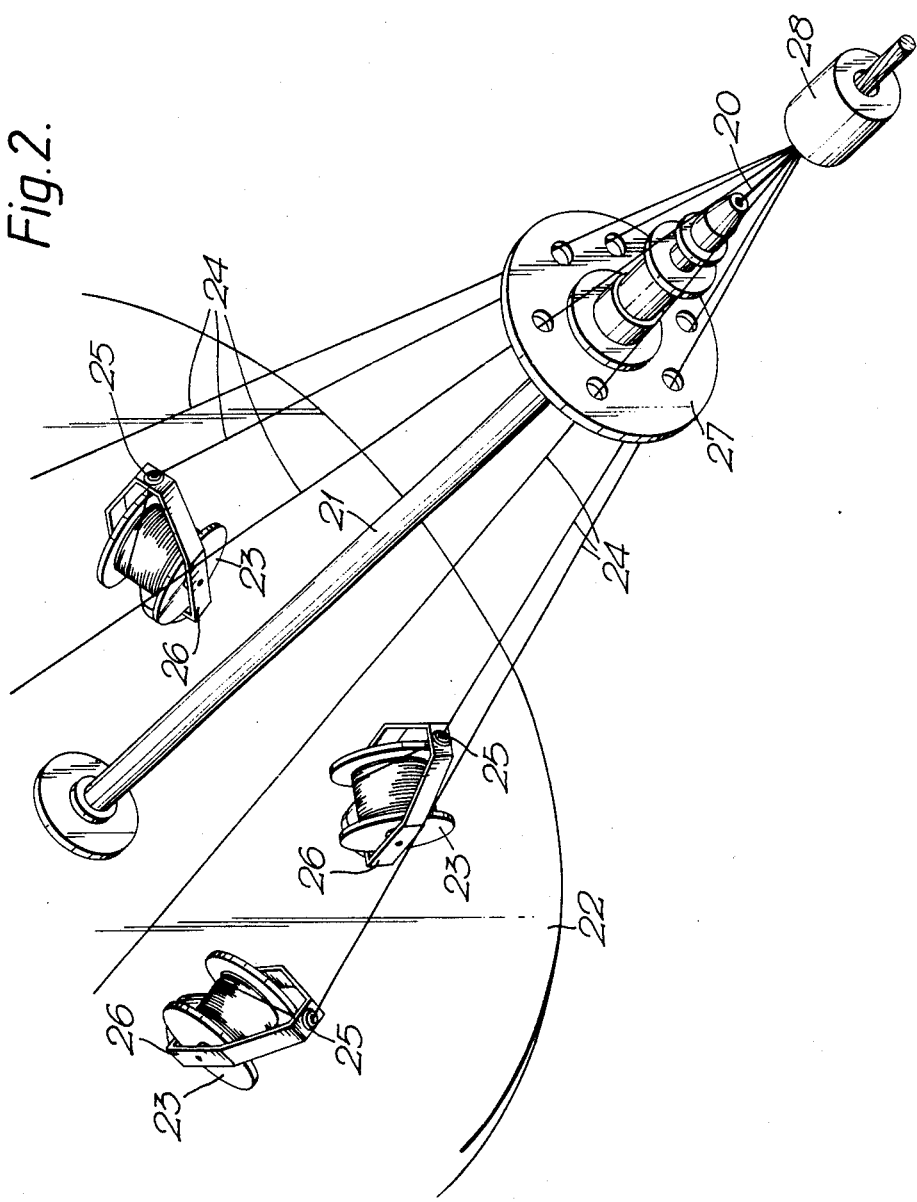
FIG. 2 is a perspective view of part of a planetary strander used in the making of the cable of FIG. 1.

In a modified version of the strander of FIG. 2, the use of individual dies 25 for each wire 24 is dispensed with, and instead their place is taken by fairings which allow free passage of the wires through their orifices. In these circumstances the individual wires are worked into a non-circular cross-section in the closing die 28. In this instance, the closing die may co-operate with a point (not separately illustrated) in such a way as to define an annulus through which the wires have the pass. The dimensions of this annulus are such as to cause the individual wires to be deformed by contact with the point, with the die, and with the other members of the set, from a circular cross-section, as depicted by the broken line 30 (FIG. 3), to a wedge-shaped one 31. The point is hollow so as to permit the optical fibre package to pass freely through its middle.

Figure 4:
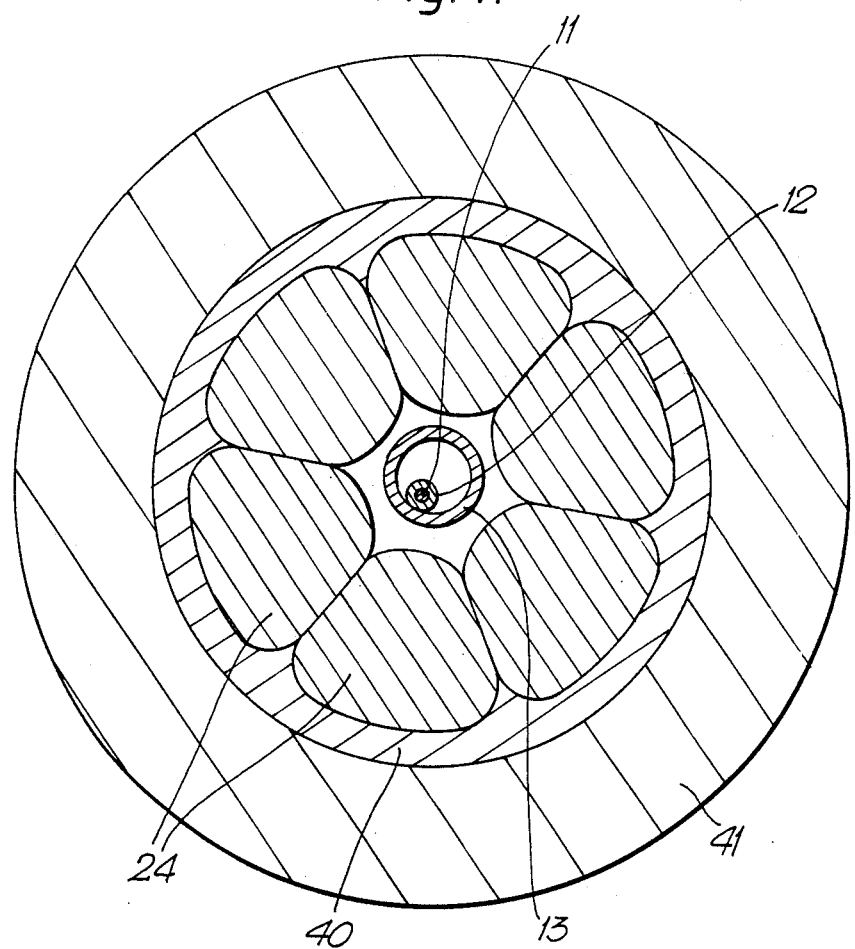
FIG. 4 is a sectional view of a cable whose crush-resistant tube is made using a further modification of the method employed in the manufacture of the cable of FIG. 1.

The use of the co-operating point is not essential for deformation of the wires to be accomplished by means of the closing die 28, and in FIG. 4 there is depicted a tracing of a photograph of a section of cable whose crush-resistant tube is formed of six copper wires deformed from circular cross-section by the closing die without the aid of a co-operating point. In this instance the hermetic barrier tube 13 has an external diameter of 0.8mm. The six wedge-shaped wires 24 co-operating to form the crush-resistant tube are formed from 16 gauge British Standard Wire gauge (64.00 mils diameter) copper wire, and the closing die provides the resulting crush-resistant tube with an external diameter of 4.1mm. On line with the laying-up of this tube, it is provided with a first extruded layer 40 of semiconductive polymer and a second extruded layer 41 of medium density polyethylene.

Where, in addition to providing crush-resistance, the material of the tube is also required to provide a significant proportion of the tensile strength of the cable, it will generally be preferred to use wire of a material with a higher tensile modulus than copper. A preferred material is steel. Steel wires may be copper-clad in order to reduce the force necessary to draw them through the dies or die by virtue of the more ductile surface coating on the wires. On the other hand, in instances, where the tensile strength of the crush-resistant tube is not so important and instead, where the provision of a high electrical conductivity path is desirable, for instance for power-feeding purposes, a crush-resistance tube constructed from wires composed entirely of copper may generally be preferred.

We claim:

1. A method of manufacturing an optical fibre cable or cable element consisting of or including an optical fibre encased in a crush-resistant tube constituted by a set of at least five helically stranded non-circular cross-section wires, in which method the non-circular cross-section wires are created from circular cross-section wires as the wires are stranded to form the tube, wherein the set of non-circular cross-section wires are worked from the set of circular cross-section wires solely by contact between the members of the set and a co-operating die.

2. A method as claimed in claim 1, wherein the working of non-circular cross-section wires from circular cross-section wires is facilitated by the use of wires, each of which as a core provided with a surface coating of a material that is more ductile than the material of the core.

3. A method as claim in claim 2, wherein the wires are copper-clad steel wires.

4. A method as claimed in claim 1, wherein the wires are copper wires.

5. A method as claimed in claim 1, wherein the number of wires constituting the set is six.

* * * * *